United States Patent [19]

Miura et al.

[11] Patent Number: 4,607,541
[45] Date of Patent: Aug. 26, 1986

[54] AUTOMATIC TRANSMISSION

[75] Inventors: Masakatsu Miura, Kariya; Takeshi Inuzuka, Anjo, both of Japan

[73] Assignee: Aisin-Warner Kabushiki Kaisha, Anjo, Japan

[21] Appl. No.: 714,699

[22] Filed: Mar. 21, 1985

Related U.S. Application Data

[63] Continuation of Ser. No. 380,958, May 21, 1982, abandoned.

[30] Foreign Application Priority Data

May 29, 1981 [JP] Japan ................... 56-83087

[51] Int. Cl.$^4$ .................................... F16H 57/10
[52] U.S. Cl. ...................... 74/758; 74/740; 74/750 R; 74/753
[58] Field of Search ............ 74/740, 750 R, 753, 74/758

[56] References Cited

U.S. PATENT DOCUMENTS

| | | | |
|---|---|---|---|
| 3,602,055 | 8/1971 | Hause | 74/753 X |
| 3,688,601 | 9/1972 | Dach | 74/753 |
| 3,799,004 | 3/1974 | Hause | 74/753 X |
| 3,830,117 | 8/1974 | Kodama et al. | 74/753 X |
| 3,946,624 | 3/1976 | Murakami et al. | 74/753 X |
| 4,114,478 | 9/1978 | Clauss | 74/750 R X |
| 4,142,425 | 3/1979 | Ahlen et al. | 74/768 X |
| 4,178,813 | 12/1979 | Smemo | 74/753 X |
| 4,224,838 | 9/1980 | Roushdy et al. | 74/750 R X |
| 4,238,967 | 12/1980 | Volkov et al. | 74/758 |
| 4,346,622 | 8/1982 | Pierce | 74/740 X |
| 4,400,998 | 8/1983 | Bookout et al. | 74/740 |

FOREIGN PATENT DOCUMENTS

| | | | |
|---|---|---|---|
| 975941 | 11/1964 | United Kingdom | 74/758 |
| 1198074 | 7/1970 | United Kingdom | 74/753 |
| 2062145 | 5/1981 | United Kingdom | 74/758 |
| 765569 | 9/1980 | U.S.S.R. | 74/758 |

Primary Examiner—Lawrence Staab
Assistant Examiner—Dwight G. Diehl
Attorney, Agent, or Firm—Cooper, Dunham, Griffin & Moran

[57] ABSTRACT

An automatic transmission having: a torque converter; a first planetary gear set; a second planetary gear set, and friction elements operated by hydraulic servos.

The first planetary gear set has a hydraulic servo drum $D_1$ for a clutch $C_1$ connected to an input shaft, a sun gear provided within drum $D_1$ and connected to the input shaft by clutch $C_1$, a carrier connected to an output shaft, a ring gear connected to the input shaft and an intermediate shaft, a clutch $C_2$, provided in a hydraulic servo drum $D_2$, pinions rotatably supported by the carrier, and the gear set is provided on the inner side of clutch $C_2$.

The second planetary gear set has a sun gear mounted on the intermediate shaft and connected to a common inner race of a one-way clutch $F_0$, a one-way brake $F_1$, a carrier connected to a ring gear, the ring gear is connected to the output shaft, the intermediate shaft and a brake $B_2$, a one-way brake $F_2$ in series with brake $B_2$ and pinions rotatably supported by the carrier.

The common inner race is connected to a rotary drum engageable with the transmission case through brake $B_1$, the outer race of the one-way clutch $F_0$ is connected to the output shaft and a hydraulic servo drum $D_3$ of a clutch $C_3$, and the outer race of one-way brake $F_2$ is engageable with the transmission case through brake $B_2$.

11 Claims, 4 Drawing Figures

AUTOMATIC TRANSMISSION

This is a continuation of application Ser. No. 380,958, filed May 21, 1982 now abandoned.

BACKGROUND OF THE INVENTION

1. Field of the Invention

This invention relates to a vehicular automatic transmission with four forward speed ranges and one reverse position and more particularly to an automatic transmission of light and compact construction which is especially reduced in axial dimensions.

2. Description of the Prior Art

Various automatic transmissions have been proposed to establish four forward speeds and one reverse speed by operation of a fluid coupling.

SUMMARY OF THE INVENTION

It is an object of the present invention to provide an automatic transmission of the type mentioned above, which is light and compact in construction with reduced dimensions particularly in the axial direction thereof.

According to the present invention, there is provided an automatic transmission for motor vehicle, comprising a fluid-coupling type torque converter, a first planetary gear set, a second planetary gear set, and friction elements operated by hydraulic servos, including three multiple disc clutches $C_1$ to $C_3$, three multiple disc brekes $B_1$ to $B_3$, one one-way clutch $F_0$ and two one-way brakes $F_1$ and $F_2$; the first planetary gear set having an annular hydraulic servo drum $D_1$ for the clutch $C_1$ connected with an input shaft of the transmission, a sun gear provided in the drum $D_1$ and connected to the input shaft through the clutch $C_1$, a carrier connected to an output shaft mounted coaxially on the outer side of the input shaft, a ring gear connected to the input shaft through a hydraulic servo drum $D_2$ and the clutch $C_2$ provided in the drum $D_2$ and to a first intermediate shaft mounted coaxially on the outer side of the output shaft, and planetary pinions rotatably supported by the carrier and meshed with the sun and ring gears; the second planetary gear set having a sun gear mounted coaxially on the outer side of the first intermediate shaft and connected to a common inner race of the one-way clutch $F_0$ and the one-way brake $F_1$, a carrier connected to a ring gear coupled with the output shaft and the first intermediate shaft as well as to the brake $B_2$ and the one-way brake $F_2$ provided in series with the brake $B_2$, and planetary pinions rotatably supported by the carrier and meshed with the ring and sun gears; the above mentioned common inner race being connected to a rotary drum engageable with the transmission case through the brake $B_1$, the race of the one-way clutch $F_0$ being connected to the output shaft and to an annular hydraulic servo drum $D_3$ of the clutch $C_3$ through the clutch $C_3$, and the outer race of the one-way brake $F_2$ being engaged with the transmission case through the brake $B_2$; characterized in that the first planetary gear set is mounted on the inner side of the clutch $C_2$.

The above and other objects, features and advantages of the present invention will become apparent from the following description and the appended claims taken in conjunction with the accompanying drawing which show by way of example a preferred embodiment of the present invention.

BRIEF DESCRIPTION OF THE DRAWINGS

In the accompanying drawings.

DESCRIPTION OF PREFERRED EMBODIMENTS

Figure 2:
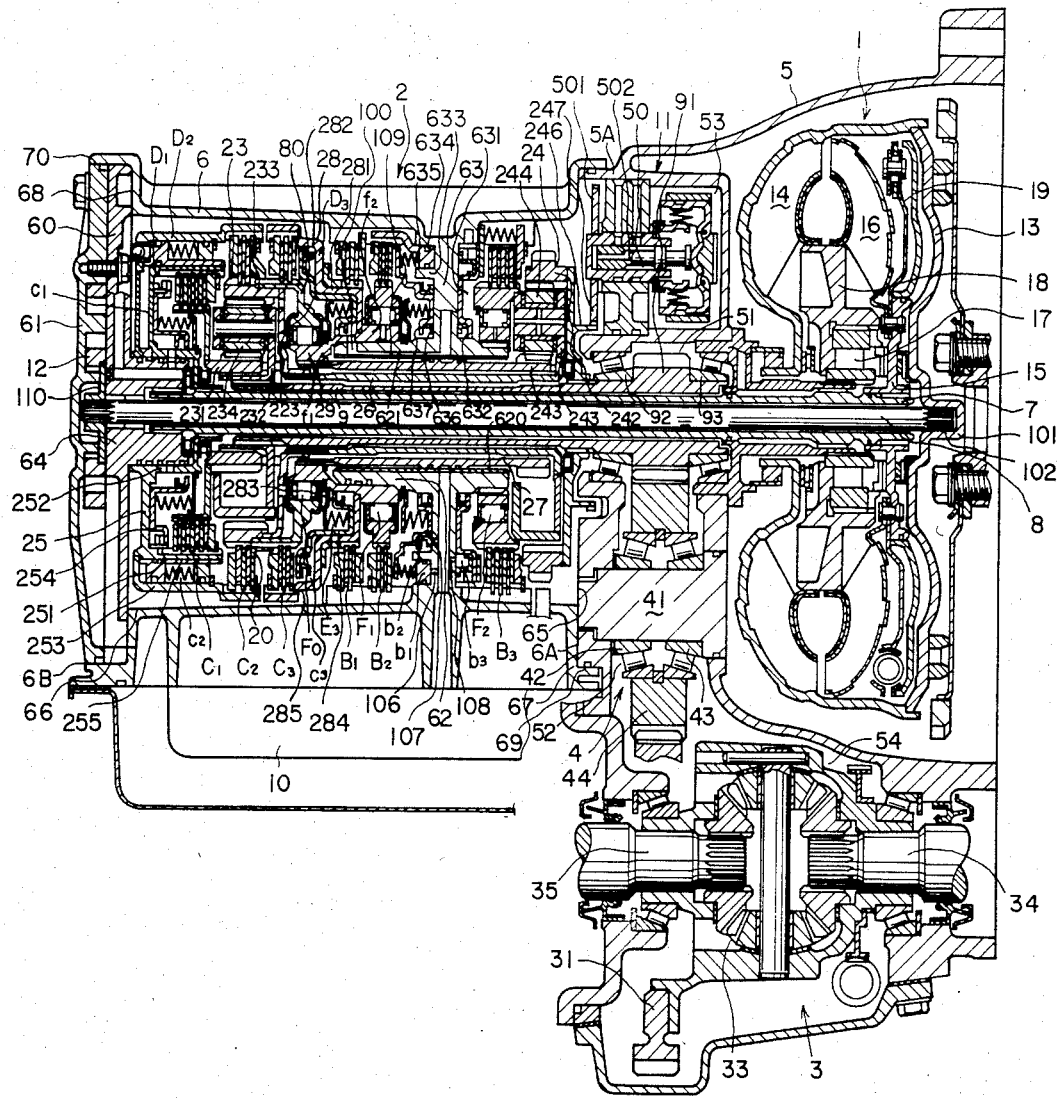
FIG. 2 is a sectional view of an automatic transmission of the invention as applied to an F-F type motor vehicle.

Referring to FIG. 2 there is shown an automatic transmission according to the present invention, which is applied to an F-F type (front engine-front drive) motor vehicle, in which indicated at 1 is a fluid coupling type torque converter which is coupled with the output shaft of the engine and provided with a direct drive clutch, at 2 a transmission gear system with four forward speeds and one reverse positions, at 3 a differential gear unit coupled with the wheel axle, and at 4 a reducing mechanism provided between the transmission gear system 2 and the differential unit 3. The torque converter 1 is received in a torque converter case 5 which is open on the front side (on the side of the engine), and the transmission gear system 2 is accommodated in a transmission case 6 which is fixedly connected to the rear end 5A of the torque converter case 5. The torque converter case 5 is provided with an output gear room 51 for holding an output gear of the transmission gear system 2, a reducing gear room 52 formed around the output gear room 51, a governor room 53 accommodating a governor pressure generator 11, and a differential gear room 54 formed at one side of the torque converter case 5. The rear end of the transmission case is closed by a rear cover 60, and an oil pump cover 61 which accommodates an oil pump 12 is securely fixed on the outer side of the rear cover 60.

The fluid coupling type torque converter 1 with a direct drive clutch is of a known construction and includes a pump impeller 14 which is coupled with the engine output shaft through a front cover 13, a turbine runner 16 which is coupled with the hollow output shaft 7 of the torque converter through a turbine hub 15, a stator which is engaged with a stationary structure through a one-way brake 17, and a direct drive clutch 19 which is coupled with the aforementioned turbine hub.

The transmission case 6 is provided with openings 65 and 66 of the same shape at an end 6A located on the side of the torque converter (on the front side) and at a rear end 6B, respectively. Extended around the openings 65 and 66 are flanged walls 67 and 68 substantially of the same shape which are formed with axially extending sockets and spigot joints 69 and 70 substantially of the same dimensions. The transmission case 6 is interiorly provided with an intermediate support wall 63 with a cylindrical center support 62 at the center thereof. The rear cover 60 which is fitted over the rear opening 66 is centrally formed with a rear center support 64 coaxially with the afore-mentioned center support 62.

The transmission gear system 2 includes a first planetary gear set 23 which is located rearward of the intermediate support wall 63, a second planetary gear set 24 which is located forward of the intermediate support wall 63, and clutches and brakes operated by hydraulic servos for coupling or engaging and releasing the elements of the respective planetary gear sets, including three multiple disc clutches $C_1$ to $C_3$, three multiple disc brakes $B_1$ to $B_3$, a one-way clutch $F_0$ and two one-way brakes $F_1$ and $F_2$. The output shaft 7 of the torque converter, which constitutes the input shaft of the transmission gear system 2, has its rear end portion journalled in the center support 64 and splined in the vicinity of its rear end to an annular rear drum 25 of a hydraulic servo which is rotatably fitted on the rear center support 64. The rear drum 25 of a hydraulic servo is open on the front side and provided with a cylindrical intermediate wall 251 and has its inner peripheral wall 252 fitted on the rear center support 64, receiving an annular piston 254 between the cylindrical intermediate wall 251 and the inner peripheral wall 252 to form an annular hydraulic servo $c_1$ for the clutch $C_1$. The rear drum 25 further has an annular piston 255 fitted between the cylindrical intermediate wall 251 and an outer peripheral wall 253 to form a hydraulic servo $c_2$ for the clutch $C_2$.

The first planetary gear set 23 includes a sun gear 231 which is coupled with the rear drum 25 through the multiple disc clutch $C_1$ formed within the cylindrical intermediate wall 251 of the drum 25, a carrier 232 splined to the transmission gear output shaft 9 which is mounted coaxially on the outer side of the input shaft 7, a ring gear 233 which is coupled with the rear drum 25 through the multiple disc clutch $C_2$ formed on the outer peripheral wall of the drum and splined to a hollow first intermediate shaft 26 of the transmission gear system coaxially on the outer side of the outer shaft 9, and planetary pinions 234 rotatably supported by a carrier 232 and meshed with the sun and ring gears 231 and 233.

A piston 632 is fitted in an annular cylinder 631 which is formed on the front side of the intermediate support wall 63, forming a hydraulic servo $b_3$ for actuating the brake $B_3$. On the other hand, an annular piston 635 is fitted in an annular cylinder 634 which is provided on the outer side of an annular protuberance 633 on the rear side of the intermediate support wall 63 to form a hydraulic servo $b_1$ for the brake $B_1$. An annular piston 637 is fitted in an annular cylinder 636 on the inner side of the afore-mentioned protuberance to form a hydraulic servo $b_2$ for the brake $B_2$.

Figure 1:
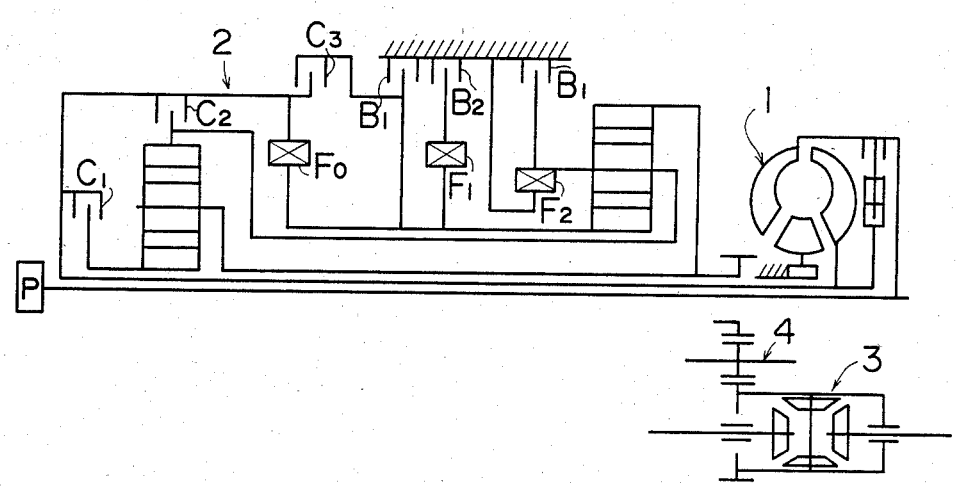
FIG. 1 is a skeletal view of an automatic transmission with four forward speeds and one reverse position.
Figure 3:
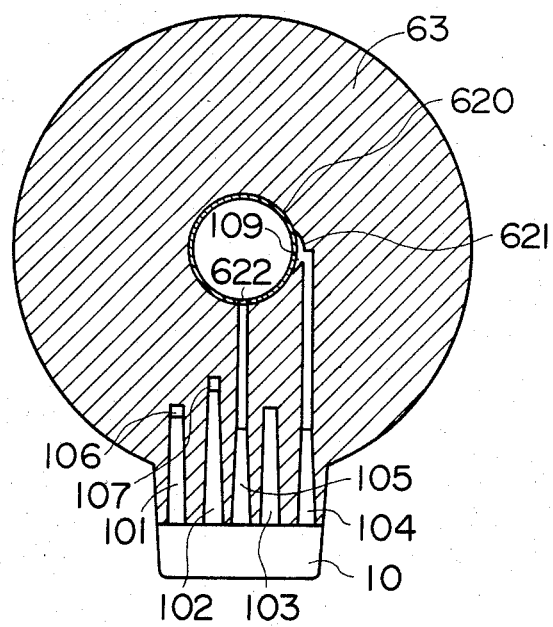
FIG. 3 is a section taken on line A—B of FIG. 2.

As shown particularly in FIG. 3, formed in the intermediate support wall 63 are oil conduits 101 to 104 which communicate the hydraulic servos $b_1$ to $b_3$ and $c_3$ with a hydraulic control system 10, respectively, and a lubricant oil passage 105. The oil conduits 101 and 102 supply the operating oil to the hydraulic servos $b_1$ and $b_2$ respectively through rearwardly extending axial passages 106 and 107. The oil conduit 103 supplies the operating oil to the hydraulic servo $b_3$ through a forwardly extending axial passage 108. The supply of oil pressure to the hydraulic servo $c_3$ is effected through an oil conduit 109 defined by an axial groove 621 formed on the inner periphery of the center support 62 and a partitioning sleeve 620 fitted in the center support 62, and a radial passage 100 formed at the rear end of the center support 62. The lubricant oil in the lubricant oil passage 105 is supplied through oil holes formed in the sleeve 620.

The second planetary gear set 24 includes a carrier 241 which is coupled with the first intermediate shaft 26 and secured to an outer race of the one-way brake $F_2$ engageable with the transmission case 6, a ring gear 242 which is splined to the output shaft 9, a sun gear 243 formed at the fore end of a second intermediate shaft 27 which is rotatably supported between a first intermediate shaft 26 and the center support 62, and planetary pinion 244 which is rotatably supported on the carrier 241 and meshed with the sun and ring gears 243 and 242.

The one-way brake $F_2$ has its inner race splined to the outer periphery of the center support 62 and is located on the inner side of the brake $B_3$. The inner race $f_1$ of the one-way clutch $F_0$ is splined to the rear end portion of the second intermediate shaft 27 and formed integrally with the inner race $f_2$ of the one way brake $F_1$ which is rotatably fitted on the rear end portion of the center support 62 to provide a common inner race 29. A rotary front drum 28 which consists of a front smaller-diameter portion 281 and a rear large-diameter portion 282 extending from the smaller-diameter portion 281 is welded to the just-mentioned common inner race 29 at the front smaller-diameter portion. A stepped annular cylinder 223 which is formed by the drum 28 and the common inner race 29 receives therein a piston 283 which has a smaller-diameter portion 284 and a larger-diameter portion 285 in conformity with the shape of the annular cylinder 223, thereby constituting the hydraulic cylinder $C_3$ which engages the drum with the hub 80 which is formed integrally with the outer race of the one-way clutch $F_0$, through the multiple disc clutch $C_3$ formed within the front drum 28. The outer race of the one-way clutch $F_0$ is splined in the hub 80 and connected to the input shaft 7 through a connecting ring 20 which is splined to the rear drum 25. The front drum 28 is engaged with the transmission case 6 through the brake $B_1$, while the outer race of the one-way brake $F_1$ is engaged with the transmission case 6 through the brake $B_2$. The one-way clutch $F_0$ is formed on the inner side of the clutch $C_3$, and the one-way brake $F_1$ is formed on the inner side of the brake $B_2$. The output shaft 7 of the torque converter 1 receives therein a drive shaft 8 which is splined in an internal bore 102 of a projection 101 formed at the center of the torque converter front cover 13. The rear end of the drive shaft 8 which is journalled in the rear center support 64 of the rear cpver has a gear 110 splined thereon thereby to drive an oil pump 12 in an oil pump cover 61 which is securely fixed to the outer wall of the rear cover.

Formed integrally at the fore end of the output shaft 9 of the transmission gear system is an output gear 91 which is rotatably supported within an output gear room 51 by a pair of tapered roller bearings 92 and 93.

The reducing mechanism 4 includes a support shaft 41 which is mounted within a reducing gear room 52 in parallel relation with the axis of the transmission gear system 2 and a reducing gear 44 which is mounted on the support shaft 41 through a pair of tapered roller bearings 42 and 43 and meshed with the output shaft 91, effecting a speed reduction between the output gear 91 and the reducing gear 44. The reducing gear 44 is meshed with a larger drive gear 31 of the differential unit to drive the vehicle wheels 34 and 35 through the differential geats 33 in the known manner.

The governor pressure generator 11 is of a known construction and has a gear 247 around the outer periphery of a cylindrical portion 246 which is projected forward from the ring gear 242 of the second planetary gear set 24, in meshed engagement with a drive gear 501 to rotate a rotary member 502 which is connected to the drive gear 501, thereby supplying to the hydraulic control system a governor pressure varying according to the vehicle speed.

Table 1 shows the conditions of the clutches, brakes, one-way clutches and one-way brakes of the transmission gear system in relation with the gear positions (RANGE) and speed reduction ratios (RATIO).

TABLE 1

| RANGE | RATIO | $C_1$ | $C_2$ | $C_3$ | $B_1$ | $B_2$ | $B_3$ | $F_0$ | $F_1$ | $F_0$ |
|---|---|---|---|---|---|---|---|---|---|---|
| 1st | 2.821 | o | x | x | x | x | Δ | x | x | o |
| 2nd | 1.564 | o | x | x | Δ | o | x | x | o | x |
| 3rd | 1.000 | o | o | x | x | o | x | o | x | x |
| 4th | 0.691 | x | o | x | o | o | x | x | x | x |
| REV | 2.231 | x | x | o | x | x | o | x | x | x |

In Table 1, the symbols "o" and "x" indicate engaged and released states of the friction elements, respectively, and the symbol "Δ" indicates either a state where engine brake is necessary or an engaged states.

Figure 4:
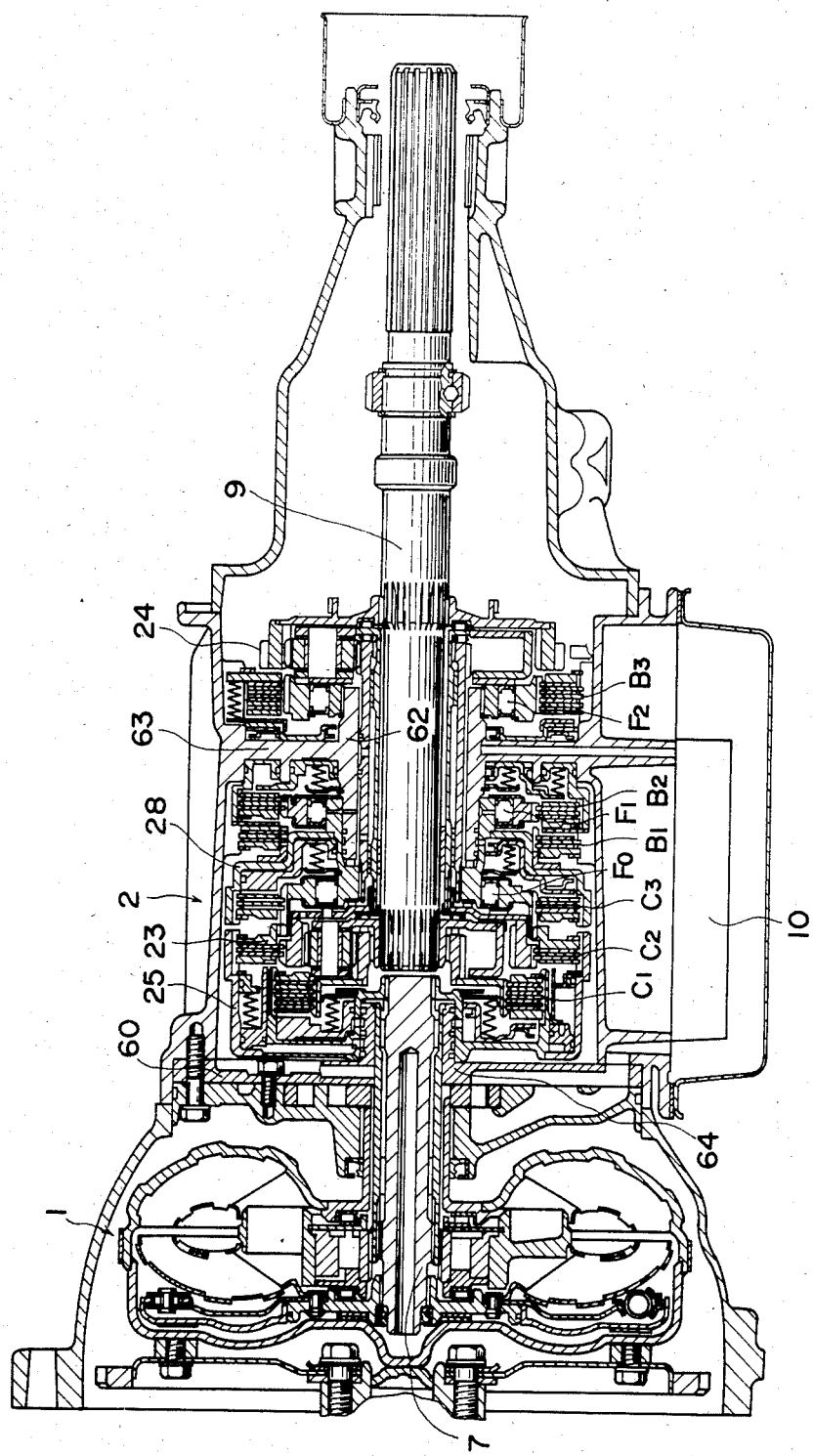
FIG. 4 is a sectional view of an automatic transmission of the present invention as applied to an F-R type motor vehicle.

FIG. 4 shows the automatic transmission of the present invention as mounted on an F-R type (front engine-rear drive) motor vehicle, in which the component parts common to FIG. 2 are designated by like reference numerals. In this embodiment, the arrangement of component parts between the input and output shafts 7 and 9 of the transmission.

As clear from the foregoing description, in an automatic transmission with four forward speeds and one reverse positions, including:

a fluid coupling type torque converter, a first planetary gear set, a second planetary gear set, and friction elements operated by hydraulic servos, including three multiple disc clutches $C_1$ to $C_3$, three multiple disc brakes $B_1$ to $B_3$, one one-way clutch $F_0$ and two one-way brakes $F_1$ and $F_2$;

the first planetary gear set having an annular hydraulic servo drum $D_1$ for the clutch $C_1$ connected with an input shaft, a sun gear provided within the drum $D_1$ and connected to the input shaft through the clutch $C_1$, a carrier connected to an output shaft mounted coaxially on the outer side of the input shaft, a ring gear connected to the input shaft through a hydraulic servo drum $D_2$ and the clutch $C_2$ provided in the drum $D_2$ and to a first intermediate shaft mounted coaxially on the outer side of the output shaft, and planetary pinions rotatably supported by the carrier and meshed with the sun and ring gears;

the second planetary gear set having a sun gear mounted coaxially on the outer side of the first intermediate shaft and connected to a common inner race of the one-way clutch $F_0$ and the one-way brake $F_1$, a carrier connected to a ring gear coupled with the output shaft and the first intermediate shaft as well as to the brake $B_2$ and the one-way brake $F_2$ provided in series with the brake $B_2$, and planetary pinions rotatably supported by the carrier and meshed with the ring and sun gears; and the above-mentioned common inner race being connected to a rotary drum engageable with the transmission case through the brake $B_1$, the outer race of the one-way clutch $F_0$ being connected to the output shaft and to a hydraulic servo drum $D_3$ of the clutch $C_3$ through the clutch $C_3$, and the outer race of the one-way brake $F_2$ being engaged with the transmission case through the brake $B_2$; the automatic transmission of the invention is characterized by the least one of the following features.

(a) The first planetary gear set is provided on the inner side of the clutch $C_2$;

(b) The first and second planetary gear sets are mounted on opposite sides of an intermediate support wall which is formed integrally with the transmission case;

(c) The hydraulic servo drums $D_1$ and $D_2$ are formed as an integral body and the annular hydraulic servo of the clutch $C_2$ is mounted on the outer periphery of the annular hydraulic servo of the clutch $C_1$;

(d) The one-way clutch $F_0$ is mounted on the inner side of the clutch $C_3$;

(e) The hydraulic servos $b_1$ and $b_2$ of the brakes $B_1$ and $B_2$ are formed on the intermediate support wall of the transmission case on the side of the first planetary gear set, with the hydraulic servo $b_1$ on the outer side of the hydraulic servo $b_2$;

(f) The one-way brake $F_1$ is formed on the inner side of the brake $B_2$;

(g) The inner race of the one-way brake $F_2$ is fitted on the outer periphery of a cylindrical center support formed in a center portion of the intermediate support wall; and (h) The oil conduits to the clutch $C_3$ and brakes $B_1$ to $B_3$ are formed in the intermediate support wall.

We claim:

1. An automatic transmission with four forward speeds and one reverse position, comprising:

an input shaft (7);

an output member (91);

first and second planetary gear sets (23), (24) each having a sun gear, a ring gear and a carrier supporting a pinion in mesh with the sun gear and ring gear;

the carrier (232) of said first gear set (23), the ring gear (242) of said second gear set (24) and said output member (91) all being connected;

the ring gear (233) of said first gear set (23) connected to the carrier (241) of said second gear set (24);

a first clutch means (C1) for selectively connecting said input shaft to the sun gear of said first gear set (23), including friction elements, a piston (254) selectively engaging said friction elements and a fluid servo in which hydraulic fluid is selectively supplied to said piston;

a second clutch means (C3) for selectively connecting said input shaft (7) to the sun gear of said second gear set (24), a third clutch means (C2) for selectively connecting said input shaft (7) to the carrier (241) of said second gear set (24), including friction elements, a piston (255) selectively engaging said friction elements and a fluid servo in which hydraulic fluid is selectively supplied to said piston;

a first drive-establishing means for selectively preventing rotation of the ring gear of said first gear set and the carrier of said second gear set in only one direction and, alternatively, in any direction;

a second drive-establishing means for selectively preventing rotation of the sun gear of said second gear set; and a drum (D1), (D2) being open to said first planetary gear set, with a cylindrical intermediate wall (251), an inner peripheral wall (252) and outer peripheral wall (253), and forming the hydraulic servos of said first and third clutch means (C1), (C2) between said intermediate wall and said inner peripheral wall and between said intermediate wall and said outer peripheral wall respectively.

2. An automatic transmission according to claim 1, furthermore comprising:
a support means having a cover which is fitted over the opening of said transmission and a center support coaxially with said input shaft supporting said inner peripheral wall.

3. An automatic transmission according to claim 2, wherein said outer peripheral wall extends over the ring gear of said first planetary gear set and said first friction elements of said third clutch means (C2) is positioned between said outer peripheral wall and the ring gear of said first planetary gear set.

4. An automatic transmission according to claim 1, wherein said outer peripheral wall extends over the ring gear of said first planetary gear set and said first friction elements of said third clutch means (C2) is positioned between said outer peripheral wall and the ring gear of said first planetary gear set.

5. An automatic transmission with four forward speeds and one reverse position, comprising:
an input shaft (7);
an output member (91);
first and second planetary gear sets (23), (24) each having a sun gear, a ring gear and a carrier supporting a pinion in mesh with the sun gear and ring gear;
the carrier (232) of said first gear set (23), the ring gear (242) of said second gear set (24) and said output member (91) all being connected;
the ring gear (233) of said first gear set (23) connected to the carrier (241) of said second gear set (24);
a first clutch means (C1) for selectively connecting said input shaft to the sun gear of said first gear set (23);
a second clutch means (C3) for selectively connecting said input member (7) to the sun gear of said second gear set (24);
a third clutch means (C2) for selectively connecting said input shaft (7) to the carrier (241) of said second gear set (24);
a first drive-establishing means having additional brake means B3 and one-way brake means (F2) in series with said additional brake means (B3) for selectively preventing rotation of the ring gear of said first gear set and the carrier of said second gear set in only one direction and, alternatively, in any direction;
a second drive-establishing means having brake means (B1) for selectively preventing rotation of the sun gear of said second gear set and additional brake means (B2) and one-way brake means (F1) in series with said additional brake means (B2) for selectively preventing rotation of the sun gear of said second gear set in only one direction,
a one-way clutch means (F0) for preventing rotation of the sun gear of said second gear set in only one direction relative to said input shaft when said third clutch means (C2) is engaged; and
a center support means, on which said first and second gear sets are mounted on opposite sides, having an intermediate support wall (63), center support (62) extending to both sides of said support wall (63) on which the inner race (29) of said one-way clutch (F0) connected to the inner race of said one-way brake (F1) is supported rotatably and on which the inner race of said one-way brake (F2) is mounted.

6. An automatic transmission according to claim 5, wherein said brake means (B1), and additional brake means (B2) each including friction elements, a piston selectively engaging said friction elements and a fluid servo in which hydraulic fluid is selectively supplied to said piston, are positioned to one side of said intermediate support wall, and the servos of said brake means (B1), and additional brake means (B2) are formed at outer peripheral portion and inner peripheral portion of said center support means respectively, and the piston of said brake means (B1) extends beyond the friction elements of said additional brake means (B2) for engaging the friction elements of said brake means (B1).

7. An automatic transmission according to claim 6:
wherein the hydraulic servo of said clutch means (C3) is formed between an annular cylinder connected to the inner race of said one-way clutch means (F0) and one-way brake means (F1) over said one-way clutch means (F0) and the piston of said clutch means (C3).

8. An automatic transmission according to claim 7 wherein said one-way brake means (F1) is positioned on an inner side of said brake means (B2).

9. An automatic transmission according to claim 6 wherein said one-way brake means (F1) is positioned on an inner side of said brake means (B2).

10. An automatic transmission according to claim 5:
wherein the hydraulic servo of said clutch means (C3) is formed between an annular cylinder connected to the inner race of said one-way clutch means (F0) and one-way brake means (F1) over said one-way clutch means (F0) and the piston of said clutch means (C3).

11. An automatic transmission according to claim 10 wherein said one-way brake means (F1) is positioned on an inner side of said brake means (B2).

* * * * *